(12) United States Patent  (10) Patent No.: US 7,516,091 B2
Jeon  (45) Date of Patent: Apr. 7, 2009

(54) SYSTEM AND METHOD FOR ELECTRONIC SETTLEMENT USING KEYBOARD HAVING MULTIPLE CARD IDENTIFICATION AND CHARGING FUNCTIONS

(76) Inventor: Dong-Hyun Jeon, 123-206, Jugong Apt., Gaepo, 1-dong, Kangnam-gu, Seoul (KR) 135-805

( * ) Notice: Subject to any disclaimer, the term of this patent is extended or adjusted under 35 U.S.C. 154(b) by 987 days.

(21) Appl. No.: 10/643,648

(22) Filed: Aug. 20, 2003

(65) Prior Publication Data

US 2005/0044020 A1  Feb. 24, 2005

(51) Int. Cl.
*G06Q 30/00* (2006.01)
(52) U.S. Cl. .............................. 705/26; 705/77; 705/39; 705/42; 705/44; 380/52
(58) Field of Classification Search .................. 705/26; 380/24; 235/486, 492, 380
See application file for complete search history.

(56) References Cited

U.S. PATENT DOCUMENTS

| | | | | |
|---|---|---|---|---|
| 3,346,850 | A * | 10/1967 | Wehrig | 710/1 |
| 5,034,596 | A * | 7/1991 | Utsunomiya | 235/380 |
| 5,296,692 | A * | 3/1994 | Shino | 235/486 |
| 5,809,143 | A * | 9/1998 | Hughes | 705/77 |
| 6,216,955 | B1 * | 4/2001 | Le Roux et al. | 235/492 |
| 6,725,318 | B1 * | 4/2004 | Sherman et al. | 710/313 |
| 2005/0035193 | A1 * | 2/2005 | Gustin et al. | 235/379 |

FOREIGN PATENT DOCUMENTS

WO  WO 01/02934 A1 * 1/2001

* cited by examiner

*Primary Examiner*—F. Zeender
*Assistant Examiner*—Luna Champagne
(74) *Attorney, Agent, or Firm*—Keusey, Tutunjian & Bitetto, P.C.

(57) ABSTRACT

An electronic settlement system/method includes a keyboard having multiple card identification and charging functions. The electronic settlement may include charges with a smart card, an RF card, or a magnetic card using the keyboard with an electronic cash management server via a web server interlocked with a PC. A settlement approval step may be included to access the electronic commerce server via a web server through a line separate from the electronic cash management server for choosing an item and a settlement type. Scanning the charged card according tithe settlement type using the keyboard may be employed for getting a settlement approval and confirmation. A safe and convenient method/system is provided using a keyboard to identify magnetic cards, read/write smart cards and RF cards. A user PC is coupled with the keyboard through electronic cash management servers, financial settlement institute servers, and/or electronic commerce servers on the Internet.

2 Claims, 7 Drawing Sheets

SYSTEM AND METHOD FOR ELECTRONIC SETTLEMENT USING KEYBOARD HAVING MULTIPLE CARD IDENTIFICATION AND CHARGING FUNCTIONS

BACKGROUND OF THE INVENTION

1. Field of the Invention

The present invention relates to a system and a method for an electronic settlement using a keyboard having multiple card identification and charging functions, and more particularly to a system and a method for an electronic settlement using a keyboard having multiple card identification and charging functions wherein an electronic settlement and a card-charging can be performed under an interlock with electronic cash management servers, financial settlement institute servers, and/or electronic commerce servers on the internet by using a keyboard and a PC (Personal Computer) coupled with the keyboard, which keyboard being able to identify conventional magnetic cards and read/write smart cards and RF (Radio Frequency) cards.

2. Description of the Prior Art

As generally known in the art, a smart card (also referred to as an IC card) or an RF card has been commercialized in accordance with the introduction of an on-line electronic settlement system and in order to solve the security problems of magnetic cards, which are generally used as credit cards, caused by the drain of personal information and illegal copy.

When the smart card or the RF card is to be used in a personal computer system, a connection is needed between the user's computer and the read/write device of the card. In conventional computer systems, the input/output port of the computer's main body and the read/write device of the card have been connected through a cable. However, such a connection has a problem from an aesthetic point of view, because it adds to the complexity of wirings connecting other peripheral devices (e.g., mouse, speaker, monitor) to the main body. In addition, there was a difficulty in installation because of a limitation to the length of the cable.

A keyboard-coupled chip card read/write device has been proposed to solve the above-mentioned problems. The device comprises a separate RAM in its keyboard circuit for reading and storing the chip card's data, a control unit interlocked with the RAM for conversion into a key scan code, and a separate driving means interlocked with the control unit for turning a switching means ON to transmit the converted code to the computer. The control unit requires an additional microprocessor for data operation/control and a RAM for data storage, thereby increasing the complexity of the circuit configuration. Furthermore, the ROM provided in the microprocessor requires an additional control program, thereby increasing the manufacturing cost.

In addition, the keyboard-coupled chip card read/write device cannot be applied to various types of card settlement systems used in the electronic commerce on the internet because it can read/write smart cards only.

SUMMARY OF THE INVENTION

Accordingly, the present invention has been made to solve the above-mentioned problems occurring in the prior art, and an object of the present invention is to provide a system and a method for an electronic settlement using a keyboard having multiple card identification and charging functions, wherein an electronic settlement and a card-charging can be performed in a safe and convenient way under an interlock with electronic cash management servers, financial settlement institute servers, and/or electronic commerce servers on the internet by using a keyboard and a user PC coupled with the keyboard, which keyboard being able to identify magnetic cards and read/write smart cards and RF cards.

To accomplish this object, there is provided an electronic settlement system for on-line electronic commerce via an electronic commerce server which provides sales information of an item and a financial settlement institute server which conducts financial settlements, the system comprising: an electronic cash management server for charging a smart card and an RF card through a fund transfer or a cash service under an interlock with the financial settlement institute server; a keyboard adapted to read the information from a magnetic card through a magnetic card identification section formed on a side and read/write the information from a smart card and an RF card through a smart card identification/charging section and an RF card identification/charging section formed on the other side; and a user PC for receiving the card information from the keyboard via a USB (Universal Serial Bus) port and then transmitting it to the electronic cash management server or the financial settlement institute server in accordance with a control program and for transmitting the data from the electronic cash management server or the financial settlement institute server to the keyboard.

Preferably, the keyboard comprises: a magnetic card identification section to read magnetic cards; a smart card identification/charging section to read/write smart cards; an RF card identification/charging section to read/write RF cards; a control unit to transform the data read by the magnetic card identification section, the smart card identification/charging section or the RF card identification/charging section into a machine language code for transmission and interpret a machine language code received from the user PC for applying a control signal; and a USB up/down stream port to transmit the card information, which has been transformed into a machine language code by the control unit, to the user PC and transmit the data received via the user PC from the electronic cash management server or the financial settlement server to the control unit.

Preferably, the control unit comprises an encoder to transform the card information into a machine language code for transmission and a decoder to interpret a machine language code received from the user PC for applying a control signal.

Preferably, the keyboard further comprises a receipt printer output section to output the service particulars of the magnetic card settled via the electronic commerce server under an interlock with the control unit.

Preferably, the receipt printer output section is connected to an external printer for receipt printing via an output port formed on a side of the keyboard and a connection cable. The external printer for receipt printing may further comprise a separate input port for a releasable interlock with the output port of the keyboard.

The receipt printer output section may output the service particulars of the magnetic card under an interlock with an internal printer for receipt printing housed within the keyboard.

Preferably, the user PC comprises: a transmission/reception section interlocked with the electronic cash server, the financial settlement institute server and the electronic commerce server via a web server; a microprocessor having a decoder and an encoder to interpret the machine language code received under an interlock with the control unit of the keyboard for providing the transmission/reception section with a control signal and to transform the data received from the electronic cash management server, the financial settlement institute server and the electronic commerce server via the transmission/reception server into a machine language code for transmitting it to the control unit of the keyboard; a memory unit for storing a control program to write the smart card and the RF card in a fund transfer or a magnetic card cash service type according to the control of the microprocessor under an interlock with the electronic cash management server; and a USB port for transmission/reception of data under an interlock with the USB up/down stream port of the keyboard according to the control of the microprocessor.

In accordance with another aspect of the present invention, there is provided an electronic settlement method comprising: a card-charging step for a user to charge a smart card, an RF card or a magnetic card using a keyboard through an access to an electronic cash management server via a web server interlocked with a user PC; a settlement approval step for the user to access the electronic commerce server via a web server through a line separate from the electronic cash management server for choosing an item and a settlement type and scan the charged card according to the chosen settlement type using the keyboard for getting a settlement approval; and a settlement confirmation step for the user to access the financial settlement institute server through a line separate from the electronic cash management server for an inquiry on the service particulars or the balance of the card and get confirmation of the settlement.

The card-charging step comprises the steps of: getting a user authentication through an access to the electronic cash management server using the user PC; choosing a card-charging type; scanning the smart card or the RF card and transmitting the card information to the financial settlement institute server if a fund transfer is chosen as the card-charging type; scanning the magnetic card and transmitting the card information to the financial settlement institute server if a cash service is chosen as the card-charging type; requesting the fund transfer or the cash service in accordance the amount of money inputted by the user; and charging the smart card or the RF card with the amount of money if the fund transfer or the cash service is approved.

The settlement approval step comprises the steps of: choosing an item and a settlement type through an access to the electronic commerce server using the user PC; scanning the card according to the chosen settlement type and transmitting the card information to the financial settlement institute server; and requesting a settlement approval to the card and confirming the settlement approval.

The settlement confirmation step comprises the steps of: getting a user authentication by scanning the card after an access to the financial settlement institute server using the user PC; inquiring the service particulars or the balance of the card in relation to the card-charging type; and confirming the establishment of the settlement by the card after the inquiry and outputting a settlement confirmation receipt using a printer for receipt printing interlocked with the keyboard.

BRIEF DESCRIPTION OF THE DRAWINGS

The above and other objects, features and advantages of the present invention will be more apparent from the following detailed description taken in conjunction with the accompanying drawings, in which.

DESCRIPTION OF THE PREFERRED EMBODIMENTS

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 1:
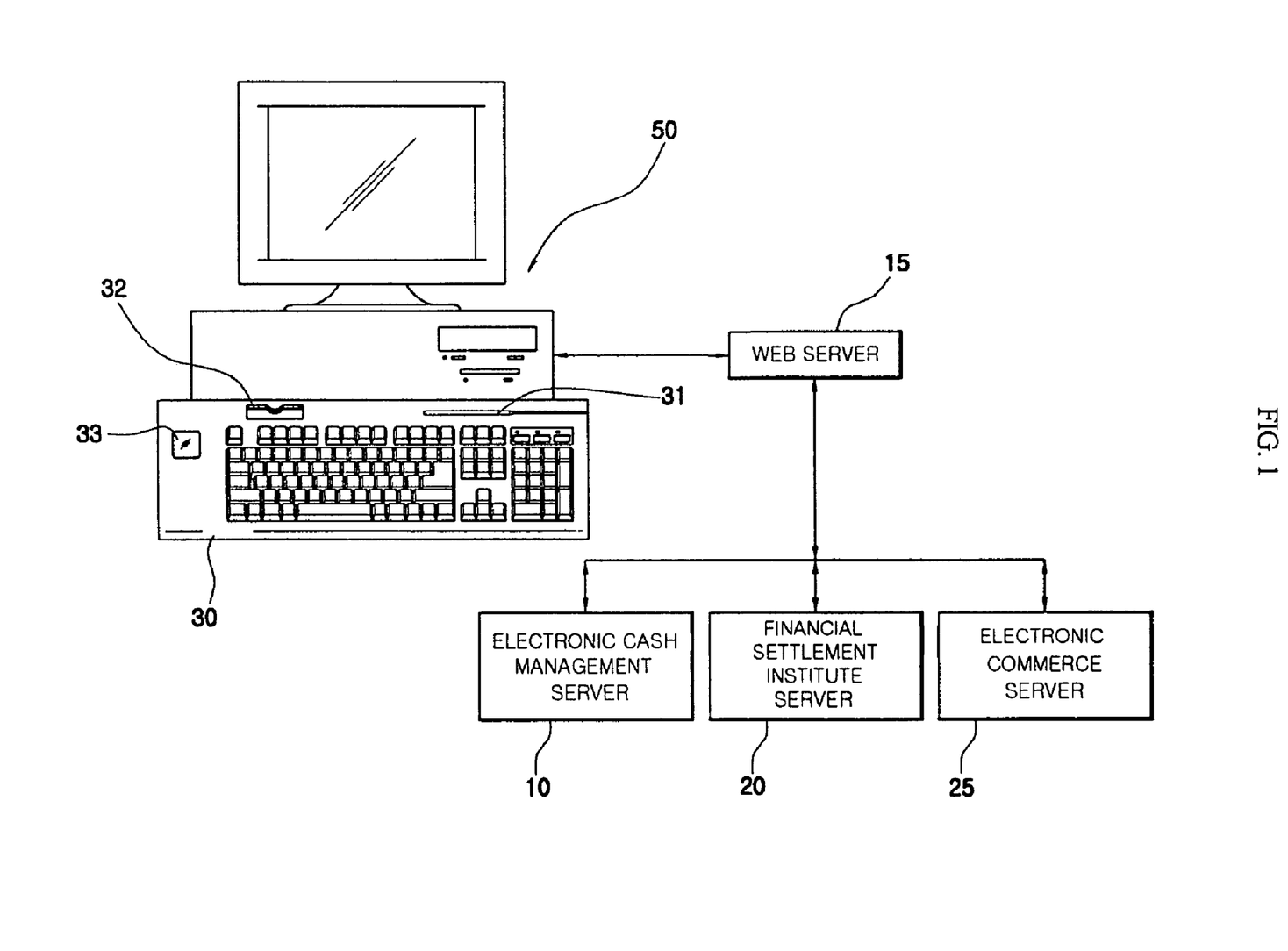
FIG. 1 shows the constitution of an electronic settlement system according to the present invention.

FIG. 1 shows an electronic settlement system according to the present invention. As shown in the drawing, the system is adapted for on-line electronic commerce via an electronic commerce server 25, which provides sales information of an item, and a financial settlement institute server 20, which conducts financial settlements. The system comprises: an electronic cash management server 10 for charging a smart card and an RF card through a fund transfer or a cash service under an interlock with the server 20 of a financial settlement institute, such as a bank, a credit card company, etc.; a keyboard 30 adapted to read the information from a magnetic card, such as a credit card, a bank cash card, etc., through a magnetic card identification section 31 formed on a side and read/write the information from a smart card and an RF card through a smart card identification/charging section 32 and an RF card identification/charging section 33 formed on the other side; and a user PC 50 for receiving the card information on the smart card, the RF card or the magnetic card from the keyboard 30 via a USB port and then transmitting it to the electronic cash management server 10 or the financial settlement institute server 20 under an interlock with a web server 15 in accordance with a control program and for transmitting the data from the electronic cash management server 10 or the financial settlement institute server 20 to the keyboard 30.

Figure 4A:
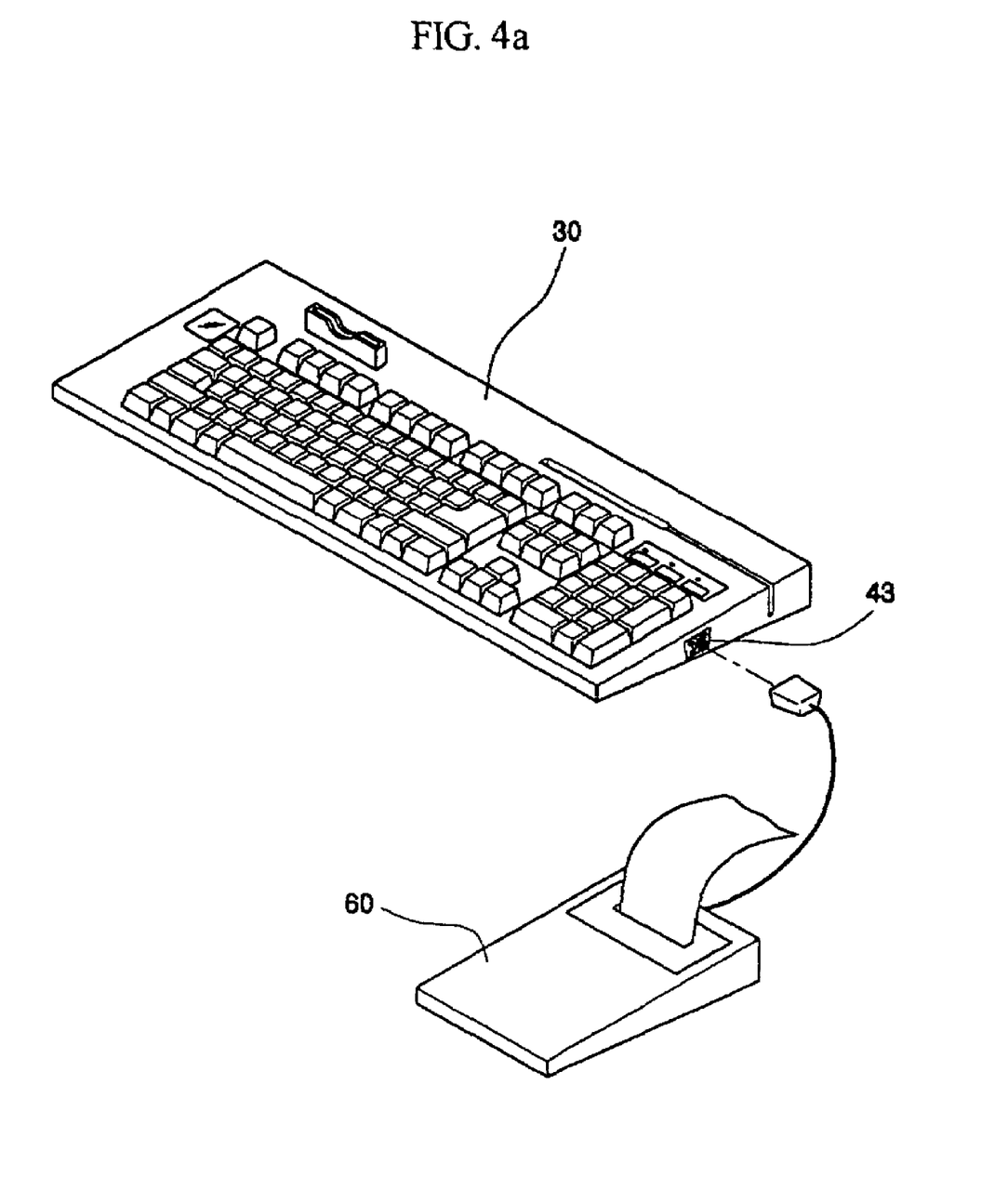
FIG. 4a shows the first embodiment of a coupling relationship between a keyboard and a printer for receipt printing according to the present invention.
Figure 4B:
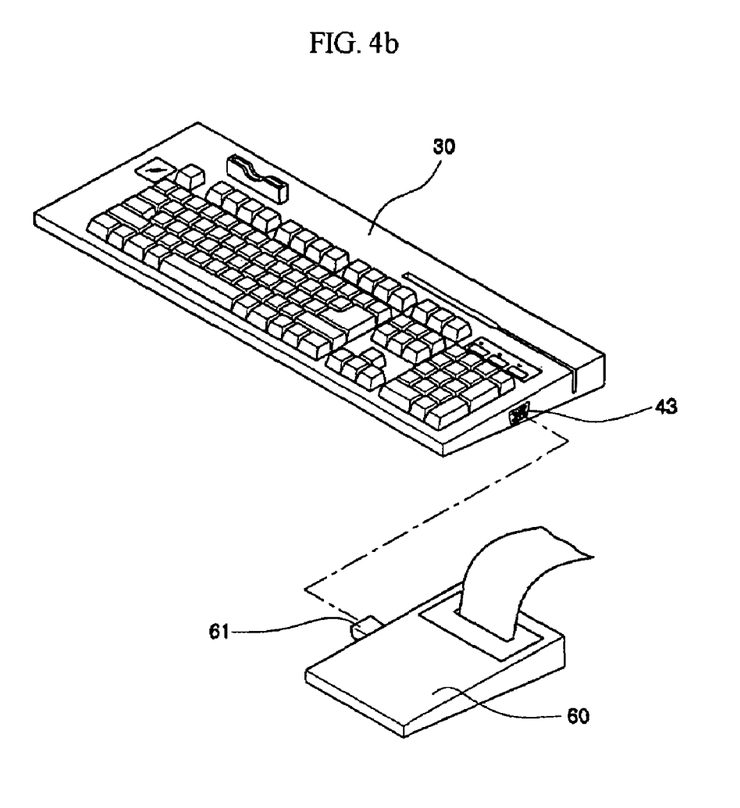
FIG. 4b shows the second embodiment of a coupling relationship between a keyboard and a printer for receipt printing according to the present invention.
Figure 4C:
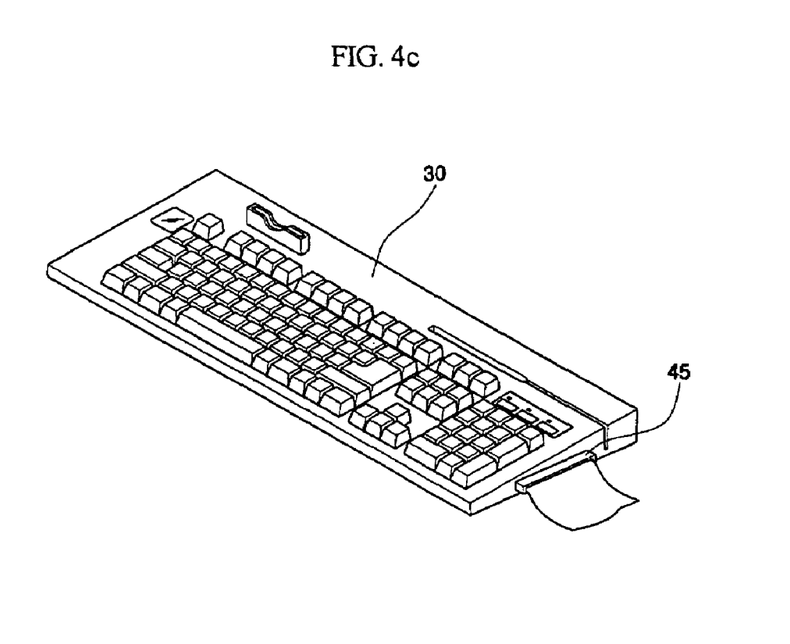
FIG. 4c shows the third embodiment of a coupling relationship between a keyboard and a printer for receipt printing according to the present invention.

The keyboard 30 may output a settlement confirmation receipt as a result of a card settlement under an interlock with an external or internal printer for receipt printing (see FIGS. 4a, 4b and 4c).

Figure 2:
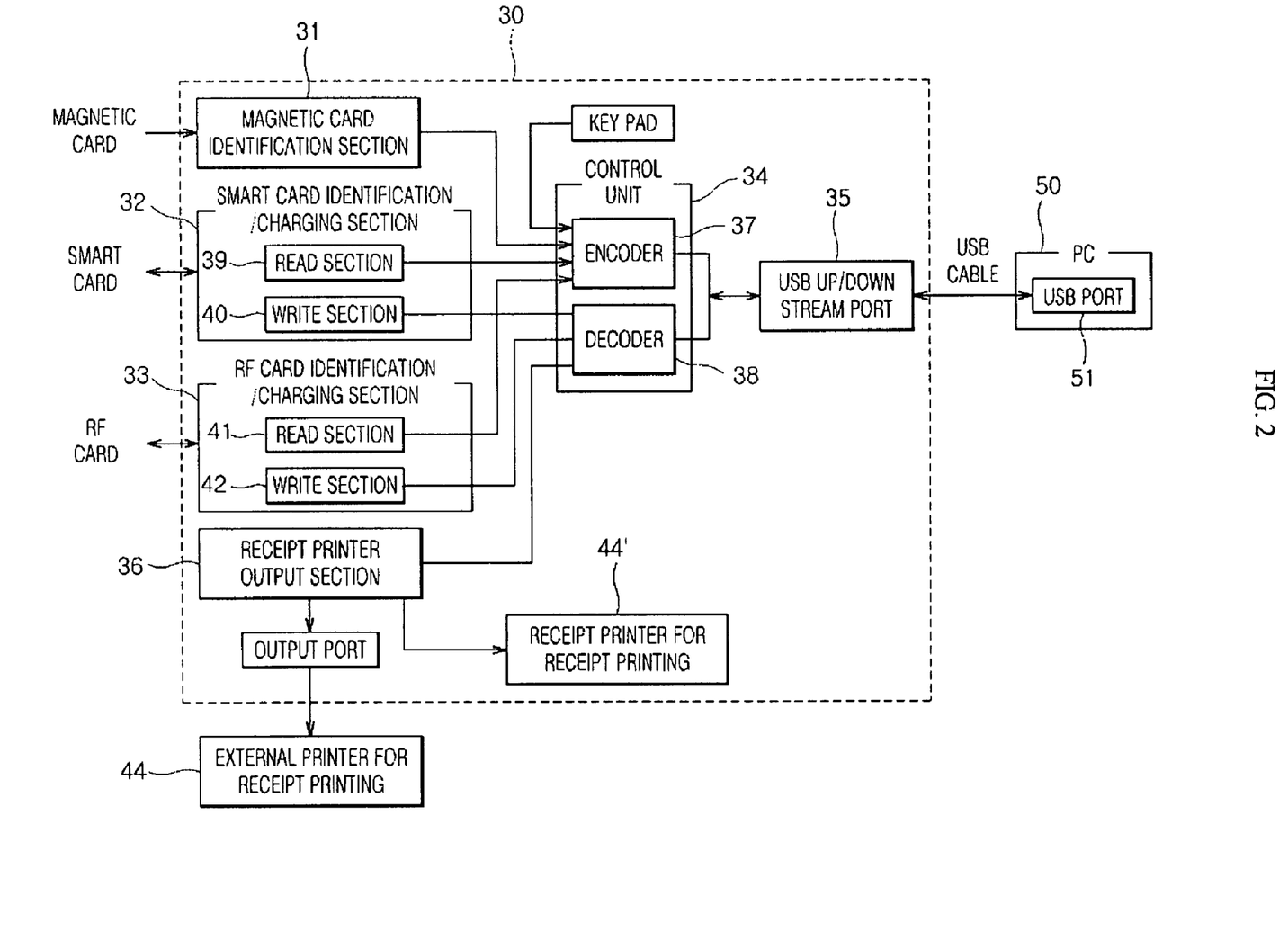
FIG. 2 is a block diagram showing the configuration of a keyboard circuit of an electronic settlement system according to the present invention.

FIG. 2 is a block diagram showing the configuration of a keyboard circuit of an electronic settlement system according to the present invention. The keyboard 30 according to the present invention comprises: a magnetic card identification section 31 to read a magnetic card; a smart card identification/charging section 32 to read/write a smart card; an RF card identification/charging section 33 to read/write an RF card; a control unit 34 to transform the data read by the magnetic card identification section 31, the smart card identification/charging section 32 or the RF card identification/charging section 33 into a machine language code for transmitting it to the user PC 50 and interpret a machine language code received from the user PC 50 for applying a control signal; a USB up/down stream port 35 to transmit the card information, which has been transformed into a machine language code by the control unit 34, under an interlock or connection with a USB port 51 of the user PC 50 and transmit the data received via the USB port 51 from the electronic cash management server or the financial settlement server to the control unit 34; and a receipt printer output section 36 to output the service particulars of the magnetic card settled via the electronic commerce server under an interlock or connection with the control unit 34.

The control unit comprises an encoder 37 for transforming the card information on the magnetic card, the smart card, or the RF card into a machine language code to transmit it and a decoder 38 for interpreting a machine language code received from the user PC 50 to provide the smart card identification/charging section 32, the RF identification/charging section 33, and the receipt printer output section 36 with a control signal.

The smart card identification/charging section 32 comprises a read section 39 for reading the card information (information on the card user) stored in the smart card and transmitting it to the encoder 37 of the control unit 34 and a write section 40 for receiving the card-charging data, i.e., whether the card is to be charged through a fund transfer or a cash service, from the decoder 38 of the control unit 34 via the electronic cash management server interlocked or in communication with the financial settlement institute server and writing it.

The RF card identification/charging section 33 comprises a read section 41 for reading the card information stored in the RF card and transmitting it to the encoder 37 of the control unit 34 and a write section 42 for receiving the card-charging data, i.e., whether the card is to be charged through a fund transfer or a cash service, from the decoder 38 of the control unit 34 via the electronic cash management server interlocked or in communication with the financial settlement institute server and writing it.

The receipt printer output section 36 may be connected to an external printer 44 for receipt printing via an output port 43 formed on a side of the keyboard 30 and a connection cable. The external printer 44 for receipt printing may comprise a separate input port for a releasable interlock or connection with the output port 43 of the keyboard 30 (see FIG. 4c).

The receipt printer output section 36 can output the service particulars of the magnetic card through an internal printer 44' for receipt printing housed within the keyboard 30.

Figure 3:
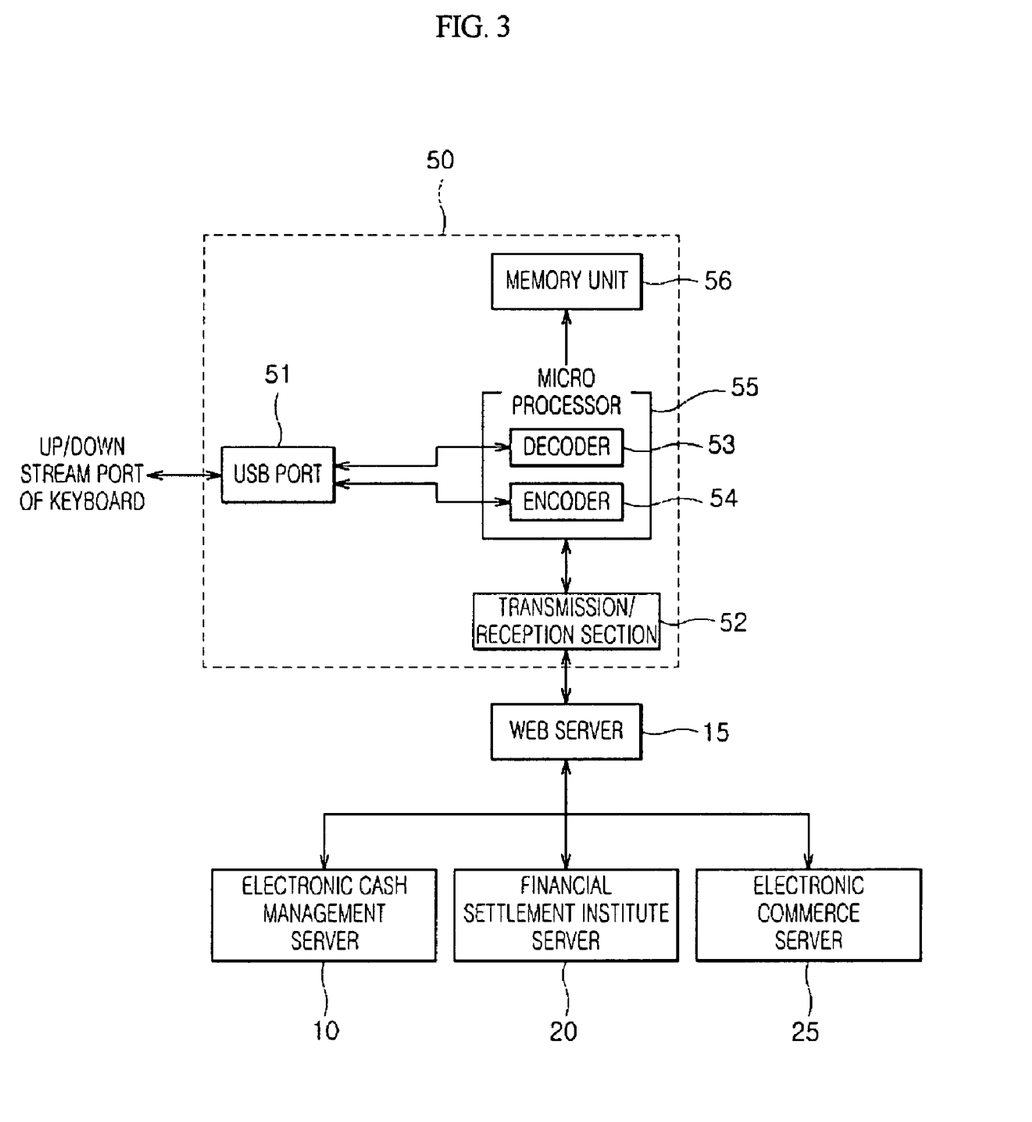
FIG. 3 is a block diagram showing the constitution of a user PC of an electronic settlement system according to the present invention.

FIG. 3 is a block diagram shows the user PC of the electronic settlement system according to the present invention. As shown in the drawing, the user PC 50 comprises: a transmission/reception section 52 interlocked or connected with the electronic cash management server 10, the financial settlement institute server 20 and the electronic commerce server 25 via a web server 15; a microprocessor 55 having a decoder 53 to interpret a machine language code received under an interlock with the control unit of the keyboard of the present invention for providing the transmission/reception section 52 with a control signal and an encoder 54 to transform the data received from the electronic cash management server 10, the financial settlement institute server 20 or the electronic commerce server 25 via the transmission/reception server 52 into a machine language code for transmitting it to the control unit of the keyboard; a memory unit 56 for storing a control program to write the smart card or the RF card in a fund transfer or a cash service type using a magnetic card, such as a credit card, a bank cash card, etc., according to the control of the microprocessor 55 under an interlock with the electronic cash management server 10; and a USB port 51 for transmission/reception of data under an interlock with the USB up/down stream port of the keyboard according to the control of the microprocessor 55.

FIGS. 4a, 4b and 4c show the embodiments of a coupling relationship between the keyboard and the printer for receipt printing according to the present invention, respectively. As shown in FIG. 4a, the keyboard 30 according to the present invention may be coupled with an external printer 60 for receipt printing via an output port 43 formed on a side of the keyboard and a connection cable.

The external printer 60 for receipt printing may further comprise an output port 43 formed as a female port on a side of the keyboard 30 and an input port 61 formed as a male port for a releasable interlock with the output port, as shown in FIG. 4b.

The keyboard 30 according to the present invention may have an internal printer (not shown) for receipt printing mounted therein. The internal printer is interlocked with the receipt printer output section within the keyboard. The user can output a receipt using the internal printer through a receipt discharge aperture 45 interlocked with the printer.

A method for an electronic settlement using the electronic settlement system according to the present invention will now be described in detail with reference to the accompanying drawings.

Figure 5:
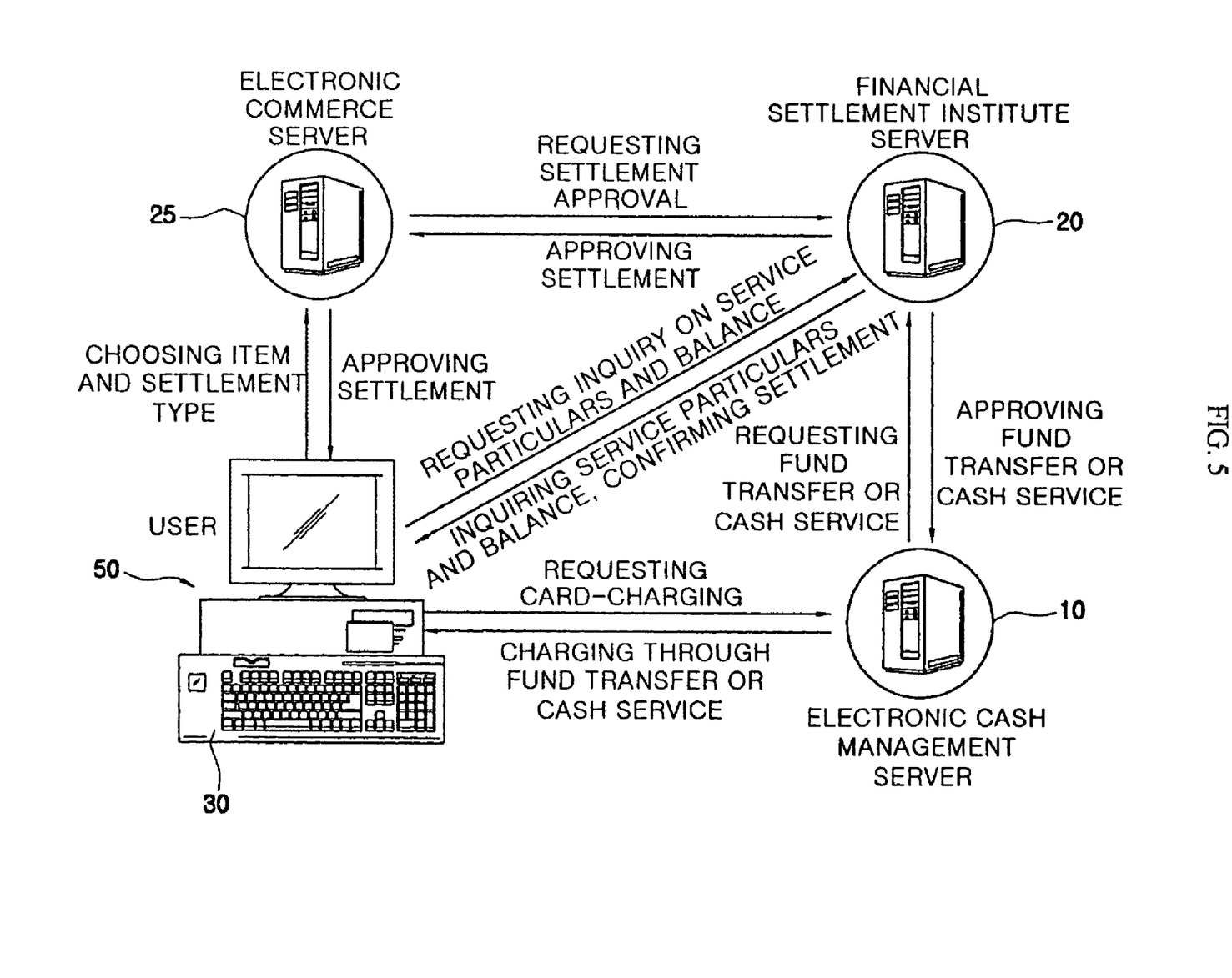
FIG. 5 is a conceptual diagram for explaining an electronic settlement method using an electronic settlement system according to the present invention.

FIG. 5 is a conceptual diagram for explaining an electronic settlement method using the electronic settlement system according to the present invention. As shown in the drawing, the electronic settlement method comprises: a card-charging step wherein if a user accesses an electronic cash management server 10 via a web server interlocked with a user PC 50 to request a card-charging by scanning a smart card, an RF card or a magnetic card using a keyboard 30, the electronic cash management server 10 requests a fund transfer or a cash service using the magnetic card under an interlock with a financial settlement institute server 20. If the financial settlement institute server 20 approves the request, the smart card or the RF card is charged. A settlement approval step may be included wherein if the user accesses a electronic commerce server 25 via a web server interlocked with the user PC 50 through a line separate from the electronic cash management server 10 to choose an item and a settlement type followed by scanning the charged card according to the chosen settlement type using the keyboard 30 for requesting a settlement, the electronic commerce server 25 requests a settlement approval under an interlock with the related financial settlement institute server 20 and then receives a settlement approval. A settlement confirmation step may be included wherein the user accesses the financial settlement institute server 20 through a line separate from the electronic cash management server 10 using the user PC 50 for requesting an inquiry on the service particulars or the balance of the card and finally getting confirmation of the settlement.

Figure 6:
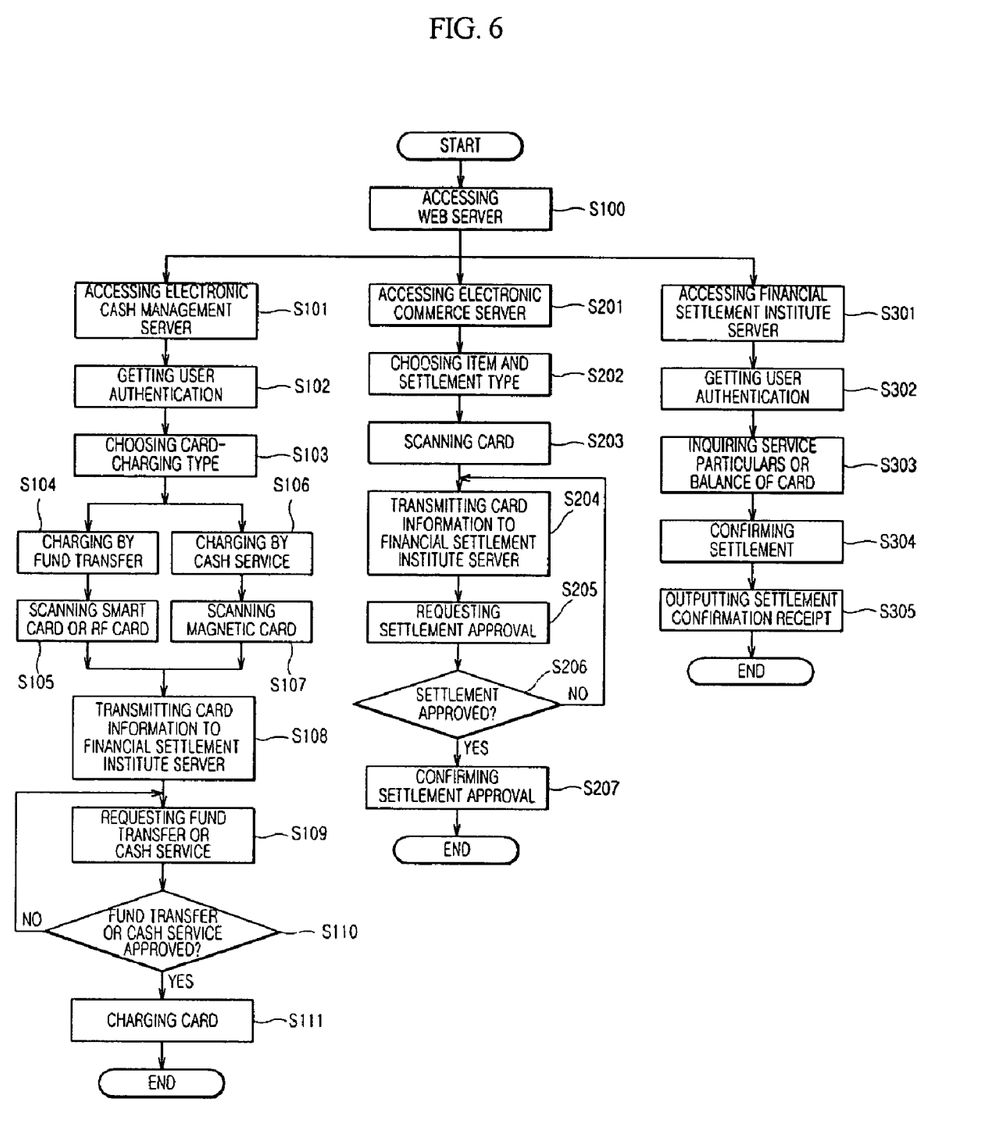
FIG. 6 is a flow chart illustrating an electronic settlement method according to the present invention.

FIG. 6 is a flow chart for explaining the respective steps of the electronic settlement method according to the present invention.

As shown in the drawing, the card-charging step comprises the steps of: accessing S100 a web server interlocked with the user PC and accessing S101 the electronic cash management server for getting S102 a user authentication; choosing S103 a card-charging type; if a fund transfer is chosen as the card-charging type S104, scanning S105 the smart card or the RF card and transmitting S108 the card information to the financial settlement institute server. If a cash service is chosen as the card-charging type S106, scanning S107 the magnetic card and transmitting S108 the card information to the financial settlement institute server; requesting S109 the fund transfer or the cash service in accordance the amount of money requested by the user; and confirming S110 if the fund transfer or the cash service is approved. If approved, charging S111 the smart card or the RF card with the amount of money. If the fund transfer or the cash service is not approved, the card information is retransmitted to the financial settlement institute server.

The settlement approval step comprises the steps of: accessing S201 the electronic commerce server via a web server interlocked with the user PC through a line separate from the electronic cash management server for choosing S202 an item and a settlement type; scanning S203 the charged smart card, the RF card or the magnetic card according to the settlement type for transmitting S204 the card information to the financial settlement institute server; and requesting S205 a settlement approval to the card followed by checking S206 if the settlement is approved and, if approved, confirming S207 the settlement.

The settlement confirmation step comprises the steps of: accessing S301 the financial settlement institute server via a web server interlocked with the user PC and getting S302 a user authentication by scanning the card; inquiring S303 the service particulars or the balance of the card in relation to the card-charging type; and confirming S304 the establishment of the settlement by the card after the inquiry and outputting S305 a settlement confirmation receipt using the printer for receipt printing interlocked with the keyboard according to the present invention.

As described above, according to the embodiments of the present invention, a safe and convenient electronic settlement can be performed using not only conventional magnetic cards, but also smart cards and RF cards through a user PC and a keyboard interlocked with the user PC.

It will be obvious to those skilled in the art that the electronic settlement system according to the present invention can be applied not only to the on-line electronic settlement through the internet as mentioned above, but also to various fields including communication, distribution, construction/traffic, insurance and education, etc.

To summarize, the system and the method for an electronic settlement using a keyboard having multiple card identification and charging functions according to the present invention have an advantage in that safe and convenient electronic settlement and card-charging can be performed using a keyboard being able to identify magnetic cards and read/write smart cards and RF cards and a user PC coupled with the keyboard under an interlock with electronic cash management servers, financial settlement institute servers, and/or electronic commerce servers on the internet.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed:

1. An electronic settlement system using a keyboard having multiple card and identification and charging functions, the electronic settlement system comprising:
    an electronic commerce server which provides sales information of an item;
    a financial settlement institute server which conducts financial settlements;
    an electronic cash management server for charging a smart card and an RF card though a fund transfer or a cash service under an interlock with the financial settlement institute server;
    a magnetic card identification section to read a magnetic card; a smart card identification/charging section to read/write a smart card; an RF card identification/charging section to read/write an RF card; a control unit to transform the data read by the magnetic card identification section, the smart card identification/charging section or the RF card identification/charging section into a machine language code for transmission and to interpret a machine language code received from the user PC for applying a control signal; a USB up/down stream port to transmit the card information, which has been transformed into a machine language code by the control unit, to the user PC and transmit the data received via the user PC from the electronic cash management server or the financial settlement server to the control unit; a keyboard having a receipt printer output section to output the service particulars of the magnetic card settled via the electronic commerce server under an interlock with the control unit; and
    a transmission/reception section interlocked with the electronic cash management server, the financial settlement institute server and the electronic commerce server via a web server; a microprocessor having a decoder and an encoder to interpret the machine language code received from under an interlock with the control unit of the keyboard for providing the transmission/reception section with a control signal and transform the data received from the electronic cash management server, the financial settlement institute server and the electronic commerce server via the transmission/reception server into a machine language code for transmitting it to the control unit of the keyboard; a memory unit for storing a control program to write the smart card and the RF card in a fund transfer or a magnetic card cash service type according to the control of the microprocessor under an interlock with the electronic cash management server; and a USB port for transmission/reception of data under an interlock with the USB up/down stream port of the keyboard according to the control of the microprocessor.

2. An electronic settlement system using a keyboard having multiple card and identification and charging functions which comprises:
    an electronic commerce server which provides sales information of an item;
    a financial settlement institute server which conducts financial settlements;
    an electronic cash management server for charging a smart card and an RF card through a fund transfer or a cash service under an interlock with Pie financial settlement institute server;
    a magnetic card identification section to read a magnetic card; a smart card identification/charging section to read/write a smart card; an RF card identification/charging section to read/write an RF card; a control unit to transform the data read by the magnetic card identification section, the smart card identification/charging section or the RE card identification/charging section into a machine language code for transmission and to interpret a machine language code received from the user PC for applying a control signal; a USB up/down stream port to transmit the card information, which has been transformed into a machine language code by the control unit, to the user PC and transmit the data received via the user PC from the electrode cash management server or the financial settlement server to the control unit; a keyboard having a receipt printer output section to output the service particulars of the magnetic card settled via the electronic commerce server under an interlock with the control unit; and a transmission/reception section interlocked with the electronic cash management server, the financial settlement institute server and the electronic commerce server via a web server; a microprocessor having a decoder and an encoder to interpret the machine language code received from under an interlock with the control unit of the keyboard for providing the transmission/reception section with a control signal and transform the data received from the electronic cash management server, the financial settlement institute server and the electronic commerce server via the transmission/reception server into a machine language code for transmitting it to the control unit of the keyboard; a memory unit for storing a control program to write the smart card and the RF card in a fund transfer or a magnetic card cash service type according to the control of the microprocessor under an interlock with the electronic cash management server; and a USB port for transmission/reception of data under an interlock with the USB up/down stream port of the keyboard according to the control of the microprocessor, the electronic settlement system configured for executing the steps of:

a card-charging step for a user to charge a smart card or an RF card using the keyboard through an access to an electronic cash management server via a web server interlocked with a user PC;

a settlement approval step for the user to access the electronic commerce server via a web server through a line separate from the electronic cash management server for choosing an item and a settlement type and scan the charged card according to the chosen settlement type using the keyboard for getting a settlement approval; and a settlement confirmation step for the user to access the financial settlement institute server through a line separate from the electronic cash management server for an inquiry on the service particulars or the balance of the card and get confirmation of the settlement, wherein the card-charging step comprises the steps of:

getting a user authentication through an access to the electronic cash management server using the user PC;

choosing a card-charging type;

scanning the smart card or the RF card and transmitting the card information to the financial settlement institute server if a fund transfer is chosen as the card-charging type;

scanning the magnetic card and transmitting the card information to the financial settlement institute server if a cash service is chosen as the card-charging type;

requesting a fund transfer or cash service in accordance with the amount of money inputted by the user; and charging the smart card or the RF card with the amount of money if the fund transfer or the cash service is approved, wherein the settlement approval step comprises the steps of:

choosing an item and a settlement type through an access to the electronic commerce server using the user PC;

scanning the card according to chosen settlement type and transmitting the card information to the financial settlement institute server; and requesting a settlement approval to the card and confirming the settlement approval, wherein the settlement confirmation step comprises the steps of:

getting a user authentication by scanning the card after an access to the financial settlement institute server using the user PC;

inquiring the service particulars or the balance of the card in relation to the card-charging type; and confirming the establishment of the settlement by the card after the inquiry and outputting a settlement confirmation receipt using a printer for receipt printing interlocked with the keyboard.

* * * * *